United States Patent
Shaffer et al.

(10) Patent No.: US 6,707,827 B1
(45) Date of Patent: Mar. 16, 2004

(54) METHOD AND APPARATUS FOR OPTIMIZING AUDIO RESPONSE IN TELEPHONY-OVER-LAN SYSTEMS

(75) Inventors: Shmuel Shaffer, Palo Alto, CA (US); George E. Carter, Santa Clara, CA (US); William J. Beyda, Cupertino, CA (US)

(73) Assignee: Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/439,298

(22) Filed: Nov. 12, 1999

(51) Int. Cl.[7] .................................................. H04J 1/02
(52) U.S. Cl. ........................ 370/493; 370/494; 370/495; 370/529
(58) Field of Search ................................. 370/529, 356, 370/353, 354, 358, 359, 389, 463, 465, 261, 260, 352, 493, 494, 495; 379/88.17, 88.18, 93.01, 93.08; 709/204, 227, 234, 237

(56) References Cited

U.S. PATENT DOCUMENTS

| | | | |
|---|---|---|---|
| 5,319,702 A | * 6/1994 | Kitchin et al. | 379/189 |
| 5,592,586 A | 1/1997 | Maitra et al. | |
| 5,742,773 A | * 4/1998 | Blomfield-Brown et al. | 709/228 |
| 5,815,553 A | * 9/1998 | Baugh et al. | 379/88.17 |
| 5,825,771 A | * 10/1998 | Cohen et al. | 370/394 |
| 5,838,665 A | * 11/1998 | Kahn et al. | 370/260 |
| 5,983,183 A | * 11/1999 | Tabet et al. | 704/270 |
| 6,021,184 A | * 2/2000 | Yoshikawan | 379/93.09 |
| 6,111,755 A | * 8/2000 | Park | 361/727 |
| 6,167,043 A | * 12/2000 | Frantz | 370/356 |
| 6,175,565 B1 | * 1/2001 | McKinnon et al. | 370/354 |
| 6,219,378 B1 | * 4/2001 | Wu | 370/484 |
| 6,240,070 B1 | * 5/2001 | Kozdon et al. | 370/260 |
| 6,259,691 B1 | * 7/2001 | Naudus | 370/252 |
| 6,363,065 B1 | * 3/2002 | Thornton et al. | 370/352 |
| 6,404,746 B1 | * 6/2002 | Cave et al. | 370/262 |
| 6,404,873 B1 | * 6/2002 | Beyda et al. | 379/202.01 |
| 6,463,053 B1 | * 10/2002 | Chen | 370/352 |
| 6,496,477 B1 | * 12/2002 | Perkins et al. | 370/228 |

FOREIGN PATENT DOCUMENTS

WO    WO 92/15986    9/1992

OTHER PUBLICATIONS

Adil Benyassine, Eyal Shlomot and Huan–Yu Su, Rockwell International, Dominique Massaloux, Claude Lamblin, and Jean–Pierre Petit, France Telecom–CNET, ITU–T Recommendation G.729 Annex B: A Silence Compression Scheme for Use with G.729 Optimized for V.70 Digital Simultaneous Voice and Data Applications, IEEE Communications Magazine, Sep. 1997, XP–000704425, 10 pgs.

* cited by examiner

*Primary Examiner*—Phirin Sam

(57) ABSTRACT

To improve the quality of audio signals transmitted over a computer network, a source computer (12) and a destination computer (30) that participate in the call exchange information concerning the gain and the frequency characteristics response of the audio components of each participating computer. The parameters of the audio components of the source and/or destination computer are then adjusted to produce an audio signal having one or more desired characteristics.

14 Claims, 3 Drawing Sheets

METHOD AND APPARATUS FOR OPTIMIZING AUDIO RESPONSE IN TELEPHONY-OVER-LAN SYSTEMS

FIELD OF THE INVENTION

The present invention relates to computer network systems in general, and to telephony-over-LAN systems in particular.

BACKGROUND OF THE INVENTION

As the speed of computer systems increases, the line between traditional telephony and computer systems is becoming less defined. For example, many companies are now using their local area computer networks (LANs) to transmit real time telephone signals between users on the network. These systems are generally referred to as telephony-over-LAN (ToL) or Voice over IP (VOIP) systems. The computer networks may be local area networks such as those contained within a single building, campus area networks, which may extend between several buildings, or may be a global or wide area network such as the Internet. One benefit of using a ToL system to transmit telephone signals is that the cost associated with installing and maintaining a separate telephone system, including separate wiring and dedicated telephone equipment, such as a private branch exchange (PBX), can be eliminated.

Despite the benefits of ToL systems, the sound quality of such systems is often not as good as a dedicated telephone system. One reason for the degradation of the sound quality is due to differences in the audio components of the call originating and destination computers. These audio components include microphones, sound cards, speakers and as well as the codecs that encode the voice signals into packets for transmission on the LAN. While there exists software for setting user-defined parameters of these components such as volume, treble or bass or a particular encoding method, these settings are static and are not varied with changes in network conditions or the capabilities of different users. Therefore, the audio settings used are not always optimal to produce the best possible sound quality for each call placed over the LAN. Given these shortcomings, there is a need for a system that can dynamically adjust the audio characteristics of telephonic signals transmitted over a LAN to ensure the best possible audio quality.

SUMMARY OF THE INVENTION

To improve the quality of audio signals transmitted over a packetized computer network, the present invention operates to exchange audio component data between a call source computer and a call destination computer on the network. Once the source and destination computers know the audio component data of the corresponding computer system with which they are to communicate, the audio components are dynamically programmed to optimize the transmitted sound quality for that particular call.

In one embodiment of the invention, a source computer and a destination computer determine characteristics of their audio components by looking in a local database. These characteristics can include the gain of signals transmitted from a sound card, a encoding method used by a codec and the frequency response of a microphone. The information received from the local database is transmitted to the corresponding computer such that the computers can collaborate in optimizing the component parameters to produce a quality audio signal.

In another embodiment of the invention, each of the source and destination computers determines the characteristics of its audio components by searching a database which is connected to the computer network. Once the audio characteristics are known, they are transmitted to the corresponding computer to optimize the audio components.

In yet another embodiment of the invention, the characteristics of the audio components in the source and destination computers can be determined empirically by transmitting a test signal from the source or destination and monitoring the amplitude and frequency characteristics of the audio signals produced in response to the test signal.

Once the characteristics of the audio components in the source and destination computers are known, the source computer can adjust the parameters of both the destination computer and its own audio components to produce an optimal audio signal. Alternatively, each of the source and destination computers can adjust their own audio components to produce an optimum audio signal.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE SPECIFIC EMBODIMENTS

The present invention is a system for dynamically optimizing one or more parameters of an audio component of a source and destination computer to improve the quality of voice signals transmitted on a telephony-over-LAN system.

Figure 1:
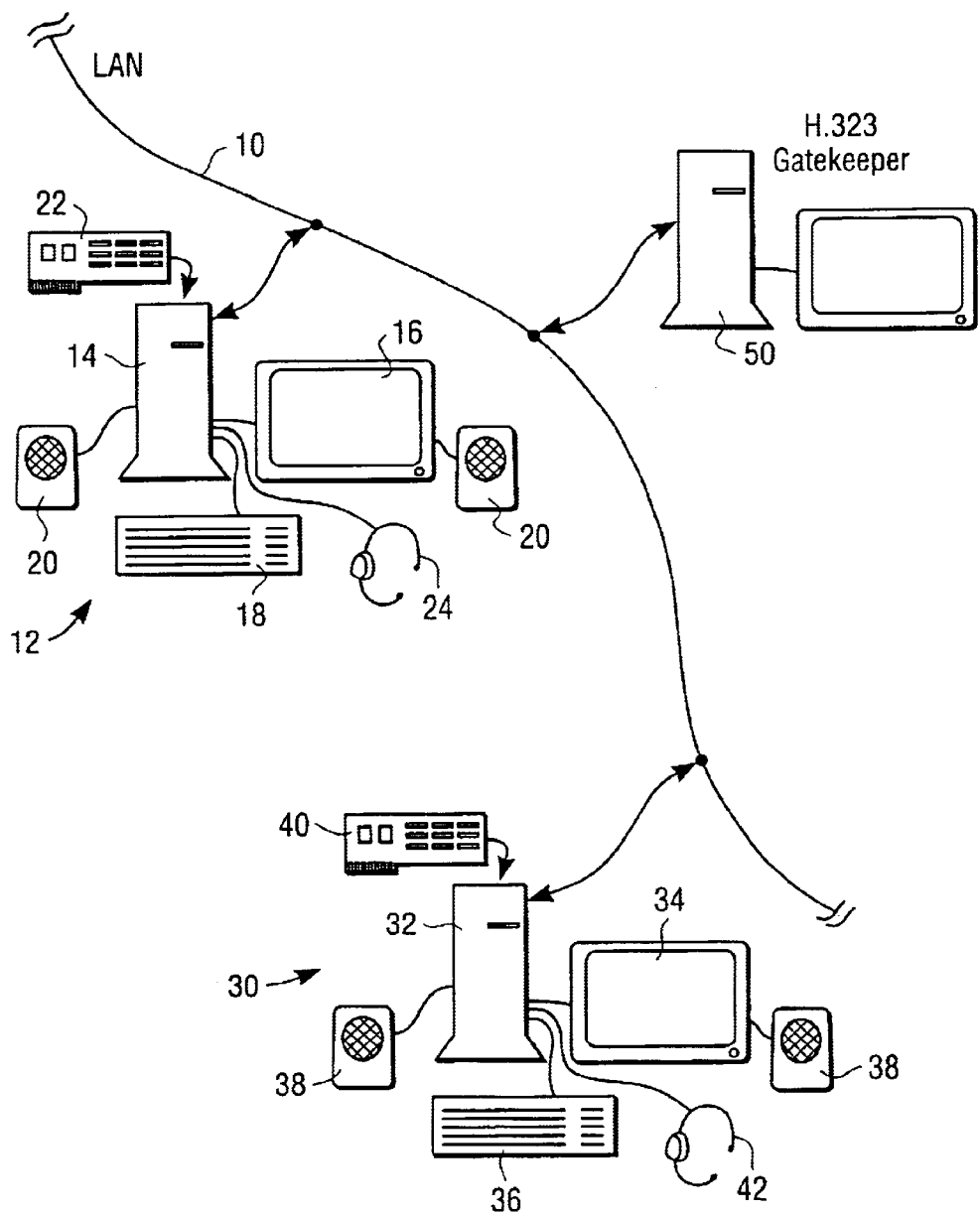
FIG. 1 is a block diagram of a telephony-over-LAN system in which the present invention operates.

FIG. 1 is a simplified block diagram of a typical telephony-over-LAN system. The system includes a computer network 10 such as a local area network, campus area network, or a global network such as the Internet, having one or more computers connected to it. A computer 12 includes such conventional components as a processor 14, monitor 16 and keyboard/mouse 18. In addition, the computer system 12 includes one or more audio components such as a set of speakers 20, a sound card 22, and a headset/microphone 24. A second computer system 30 connected to the network 10 also includes a processor 32, monitor 34 and keyboard/mouse 36. In addition, the computer system 30 has a number of audio components such as a set of speakers 38, sound card 40 and a headset/microphone 42. Each of the audio components of the computer system 30 may alone or in combination produce audio signals having a different gain and frequency content than the audio components of the computer system 12.

As indicated above, the computer systems 12 and 30 run software which allows them to transmit real time audio signals between them, thereby allowing each computer system to operate as a telephone. In most telephony-over-LAN systems, the computer network 10 also includes a gatekeeper computer 50, which performs a series of standardized operations, such as call setup and tear-down between two computers wishing to communicate over the LAN. The setup and tear-down are generally performed according to a predefined standard such as H.323 or SIP.

When a user of the network decides to make a call, a request is placed to the gatekeeper 50 which determines if the user has the proper authority to make the desired call. If so, the call is set up with the destination computer. Once the call is set up, the gatekeeper 50 typically remains idle until the call is broken down, or until a specific feature (e.g., call forwarding) is involved. In addition, the gatekeeper may periodically check on the status of the connection. Finally the gatekeeper 50 may perform additional functions as billing, so that users of the sending and receiving computers or their departments can be billed for use of the network.

As indicated above, the audio components found in the computer system 10 (the source computer), may produce audio signals having different characteristics than the audio components of the computer system 30 (the destination computer). Because of the differences in the audio components, the voice signals transmitted between the source and destination computers may not be optimized to produce an audio signal of a desired quality for the users. The desired audio signal may be defined in terms of a lack of distortion or may also be defined in terms of user preferences such as a particular gain level or frequency response. For example, some users may like more bass in their voice signals or more treble, etc.

In order to improve the audio quality of the voice signals transmitted over the LAN, the source computer 12 and the destination computer 30 exchange information concerning their particular audio components. Once the computers know about the other computer's audio components, the components can be dynamically programmed to produce an audio signal with a desired gain or frequency response.

Figure 2A:
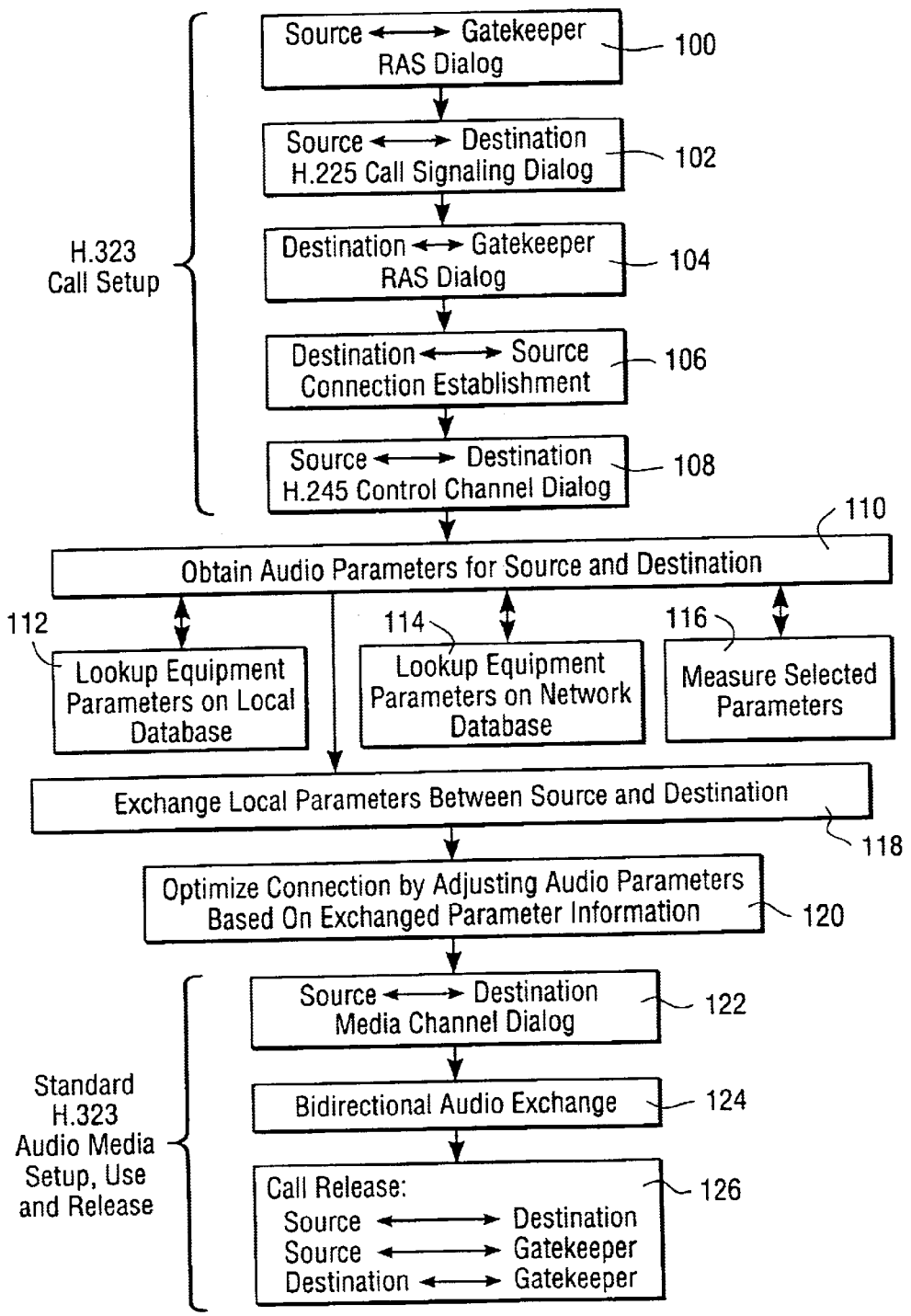
FIGS. 2A–B illustrate a series of steps performed by one embodiment of the invention to optimize audio signals transmitted by a source and destination computer on a computer network.
Figure 2B:
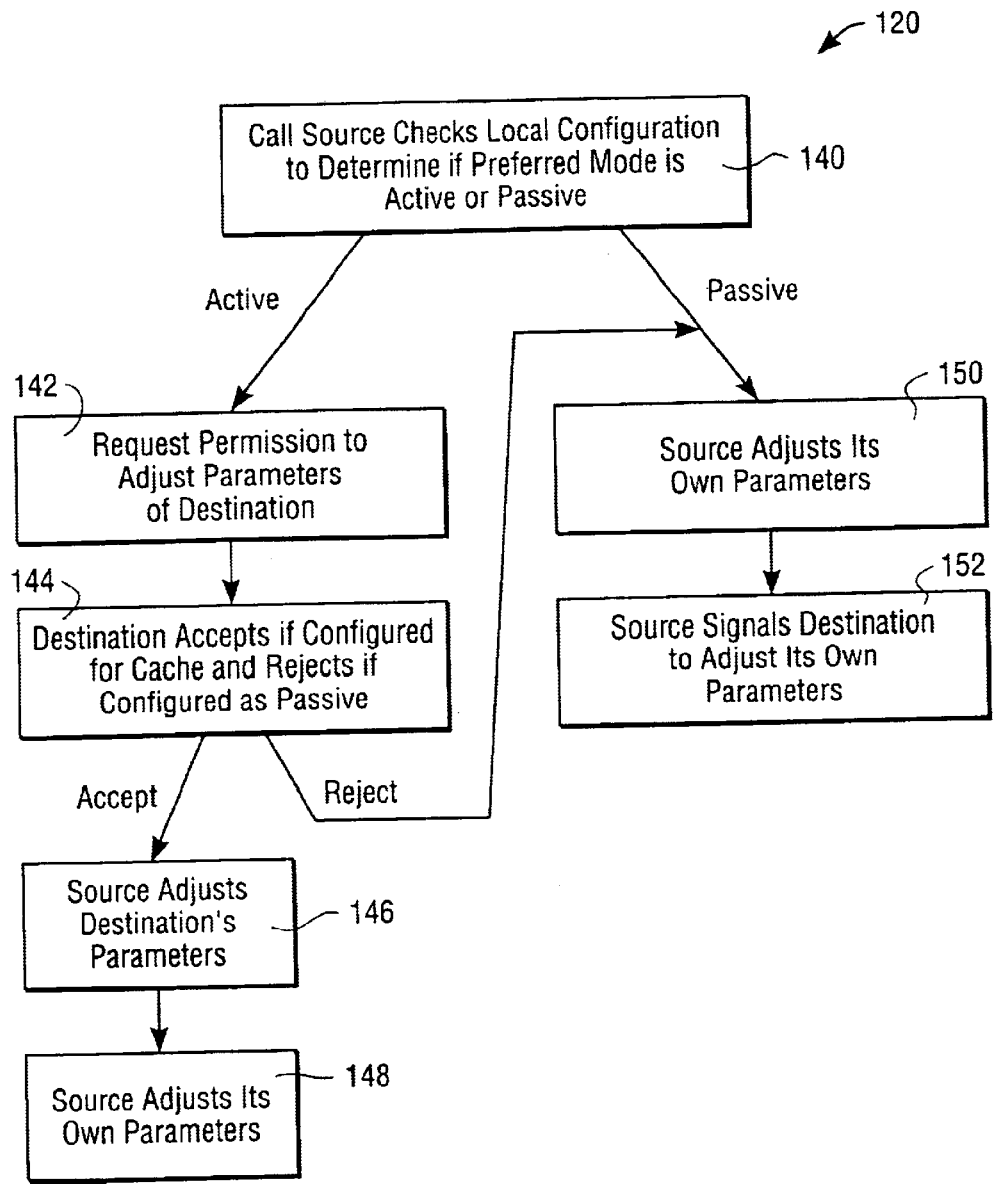

FIGS. 2A–2B illustrate a series of steps performed by one embodiment of the invention to improve the audio quality of voice signals transmitted on a LAN. Beginning with a step 100, the source computer contacts the gatekeeper to set up a call to a destination computer on the LAN. As part of the dialog between the source computer and the gatekeeper, the gatekeeper determines whether the source has the proper permission to call the destination computer. For example, if the source computer is in a building lobby and a user requests to dial an international call, the gatekeeper will likely not allow the call to continue.

At a step 102, the source computer contacts the destination computer on a signaling channel and alerts the destination computer that the source computer wishes to place a call in accordance with the H.225 call signaling standard. At a step 104, the destination computer contacts the gatekeeper to determine whether the destination computer can accept the call as well as complete other administrative tasks such as completing a billing record, etc. At a step 106, the destination computer contacts the source computer to acknowledge the call requested. Finally, at a step 108, the source and destination computers exchange terminal capabilities including the particular scheme to be used in encoding the voice data to be transmitted between the two in accordance with the H.245 control channel dialog. Each of these steps 100–108 are performed in accordance with the H.323 call setup protocol using a gatekeeper, and the direct call signaling option, which is considered to be well-known to those of ordinary skill in computer telephony arts, therefore need not be discussed in further detail.

To improve the quality of the voice signals transmitted between the source and destination computers, one embodiment of the present invention enhances the H.245 control channel dialog such that the source and destination computers obtain in step 110 information regarding their audio components and then exchange in step 118 the information in order to jointly decide on the settings of these components to produce the best possible audio signals. In a currently preferred embodiment of the invention, each computer exchanges information concerning the gain of the signals transmitted by its sound card as well as the frequency response of the microphone used at the source or destination computer.

To determine current settings for the gain of signals produced by its sound card and the frequency response of its microphone, each computer can look up these parameters on a local database at a step 112. For example, in the Windows operating system, information concerning the configuration of peripheral drivers is typically stored in the registry directory. Information on other audio characteristics of the equipment in use can be stored in a local database delivered as part of the ToL system. If the information is not stored on a local database, then each computer may be able to look up such information on a database that is accessible on the computer network at a step 114.

As an alternative to looking up the information concerning the audio components, it is possible to empirically determine the information by measuring selected parameters in a step 116. For example, information may be empirically determined by transmitting a known signal between the source and destination computers. Each computer runs software that measures gain and distortion of the audio signals created by its sound card. To determine the frequency response of the microphone, each computer can prompt a user to read a test sentence into the microphone or can cause its speakers to operate a test signal that is picked up by the microphone. The signal produced by the microphone can then be determined.

Once each computer has determined gain and frequency characteristics of its own audio equipment in step 110, the information is exchanged with the corresponding computer at a step 118. As will be explained in further detail below, once the audio component information has been exchanged between the source and destination computers, the audio components are optimized based on information received from the corresponding computer at a step 120. The settings of the audio components are determined based on a collaboration by the participating computers. For example, if a call should have a desired gain setting of "8" and one computer's sound card has its gain set at "10" and the other computer's sound card is set at "2", then the two computers can agree to reduce the gain of the first computer's sound card by 6 and to increase the gain of the second computer's sound card by 2. The gains are preferably set to achieve the highest possible gain with the lowest possible distortion.

Once the audio information has been exchanged and the computers' have collaborated to optimize the components, the call can take place between the source and destination. At a step 122, the source and destination complete a media channel dialog followed by the bidirectional exchange of audio information at a step 124. Once the call is complete, the sessions between the source and destination, between the source and gatekeeper, and between the destination and gatekeeper are released at a step 126. Each of the steps 122-126 is performed in accordance with the H.323 protocol.

FIG. 2B illustrates in further detail, the step 120 described above, wherein the audio components of the source and destination are dynamically adjusted to transmit an optimum voice signal over the local area network. Beginning at a step 140, the source computer checks its local configuration to determine if it is operating in an active or a passive mode. An active mode indicates that the source computer should attempt to adjust the audio components of the destination computer or, conversely, if the source computer is being called, to have its audio components modified by another computer. If the source computer is not programmed to operate in an active mode, it is presumed to operate in a passive mode, whereby the computer will not attempt to modify another computers audio components or to allow its audio components to be modified by a remote computer. Rather, a computer operating in the passive mode will only modify its own audio components based on the desired gain and frequency response settings that were selected.

If the source computer is operating in the active mode, then processing proceeds to a step 142, wherein the source computer requests permission from the destination computer to adjust the destination computers audio components. At a step 144, it is determined if the destination computer accepts the request to configure its audio components, i.e., the destination is operating in the active mode or rejects the request, i.e., the destination computer is operating in the passive mode. If the source and destination computers are both operating in the active mode, the source computer adjusts the destination computers' audio components to provide an optimum audio signal at a step 146. At a step 148, the source computer then adjusts its own audio components to produce an optimum audio signal. The adjustments may involve such steps as programming each computer's sound card to produce audio signals having a predefined amplitude. In addition, a graphic equalizer function in each sound card may be adjusted to compensate for variations in the frequency response of each computer's microphone.

When both the source computer and the destination computer are operating in active mode, we have specified the source computer assumes the master role and adjusts audio components on both computers. Alternatively, the destination computer could assume this master role, if an agreed-on standard specified this alternative convention. It is only necessary that all computers use the same convention.

If either the source computer or the destination computer is operating in a passive mode, processing proceeds to a step 150, wherein the source computer adjusts the operating parameters of its own audio components to provide an optimum audio signal. At a step 152, the source computer signals the destination computer to adjust the parameters of its own audio components. With the audio components adjusted, the amplitude of the audio signals and their frequency content will be selected to improve the quality of the voice signals produced and received by the source and destination computers.

The present invention is not limited to two-way calling but can be extended to multiple party calls. In such cases, during the call setup process, each computer provides the others with information concerning its audio signals and the computers negotiate how the components should be set to achieve an optimum audio signal. For multiple party calls involving a Multipoint Control Unit (MCU), this MCU should be regarded as the source computer for the call, configured in active mode, regardless of the actual originating computer. This convention extends the optimization algorithm to MCU-based calls.

What is claimed:

1. A method of transmitting audio signals between a source computer and a destination computer on a computer network, comprising:

setting up a call between the source computer and the destination computer;

exchanging information between the source and the destination computer that is indicative of the gain and frequency response of the audio signals transmitted by the audio components of the source and destination computers on the computer network;

adjusting one or more audio components in the source computer or destination computer to produce audio signals having one or more desired characteristics based on the information exchanged to compensate for distortions due to different audio components at the source computer and the destination computer; and transmitting the audio signals between the source computer and destination computer.

2. The method of claim 1, wherein the audio components include a sound card and a microphone and wherein the audio components are adjusted by varying a gain of the sound card of the source or destination computer such that the audio signals produced by the source or destination computer have a predefined amplitude; and adjusting an equalizer in the sound card of the source or destination to compensate for the frequency response of the microphones of the source or destination.

3. The method of claim 1, wherein the step of exchanging information further comprises:

reading a gain of the signals produced by the sound card and frequency response of the microphone from a database; and transmitting the gain and frequency response information between the source and destination computers.

4. The method of claim 1, wherein the step of exchanging information comprises:

transmitting a test signal between the source computer and destination computer;

measuring the gain and frequency content of the test signal transmitted; and adjusting the audio components of the source computer and destination computer based on the gain and frequency content measured.

5. A telephony over computer network system, comprising:

two or more computers coupled to the computer network, each computer having audio components including a sound card and a microphone that transmit audio signals on the network having different audio characteristics;

a gate keeper computer that initializes and tears down calls between two computers on the network;

each computer that is a party to a call exchanging information regarding their audio components and optimizing the components to transmit audio signals having desired audio characteristics on the network to compensate for distortions due to differences in audio components of the source computer and destination computer.

6. The systems of claim 5, wherein the audio characteristics include a gain of the audio signals and a frequency response.

7. A method for enhancing the quality of an audio channel, the method comprising:

establishing the audio channel to transmit audio signals between two computers;

exchanging information between the two computers, wherein the information includes the gain of the audio signals produced by audio components of the two computers, and wherein the information further includes a frequency response of the audio signals produced by the audio components of the two computers; and adjusting one or more audio components in one or both of the two computers to produce the audio signals having one or more desired characteristics based on the information transmitted to compensate for distortions as a result of different audio responses at the two computers.

8. The method of claim 7, wherein the audio components include a sound card and microphone and wherein the act of exchanging information is preceded by an act of reading from a database both a gain of the audio signals produced by the sound card and a frequency response of the microphone.

9. The method of claim 8, wherein the act of exchanging information includes an act of transmitting the gain and the frequency response between the two computers, and wherein the act of transmitting succeeds the act of reading.

10. The method of claim 7, wherein the act of exchanging information includes transmitting a test signal between the two computers, measuring a gain and a frequency content as a result of the act of transmitting the test signal, and wherein the act of adjusting includes adjusting the audio components of the two computers based on the gain and the frequency content, which are measured from the act of measuring.

11. The method of claim 7, wherein the method does not proceed in the order presented.

12. A method of transmitting audio signals between a source computer and a destination computer on a computer network wherein the source and destination computers include audio components including a sound card and a microphone, comprising:

setting up a call between the source computer and the destination computer;

exchanging information between the source computer and the destination computer that is indicative of the gain and frequency response of the audio signals transmitted by the audio components of the source and destination computers on the computer network;

adjusting one or more audio components in the source or destination computer by varying the gain of the sound card of the source or the destination computer such that the audio signals produced by the source or destination computer have a predefined amplitude and adjusting an equalizer in the sound card of the source or destination computer based on the information exchanged to compensate for the frequency response of the microphones of the source or destination computer in order to produce audio signals having one or more desired characteristics; and transmitting the audio signals between the source computer and the destination computer.

13. A method of transmitting audio signals between a source computer and a destination computer on a computer network, comprising:

setting up a call between the source computer and the destination computer;

exchanging information between the source computer and the destination computer by transmitting a test signal between the source computer and the destination computer;

measuring the gain and frequency content of the test signal transmitted; and adjusting the audio components of the source computer and the destination computer based on the gain and frequency content measured; and transmitting the audio signals between the source computer and the destination computer.

14. A method for enhancing the quality of an audio channel, the method comprising:

establishing the audio channel to transmit audio signals between two computers;

exchanging information between the two computers by transmitting a test signal between the two computers, measuring a gain and frequency content of the audio signals produced by audio components of the two computers as a result of the act of transmitting the test signal; and adjusting one or more of the audio components in one or both of the computers based on the information transmitted, including the measured gain and frequency content, in order to produce the audio signals having one or more desired characteristics and compensate for distortions as a result of different audio responses at the two computers.

* * * * *